United States Patent Office 2,956,082
Patented Oct. 11, 1960

2,956,082

REDUCTION OF ORTHONITROANILINE TO PRODUCE ORTHOPHENYLENEDIAMINE

Leslie M. Schenck, Westfield, N.J., assignor to General Aniline & Film Corporation, New York, N.Y., a corporation of Delaware No Drawing. Filed Sept. 7, 1956, Ser. No. 608,445

5 Claims. (Cl. 260—580)

This invention relates to the preparation of aromatic primary amines, and relates more particularly to an improved process for the preparation of orthophenylenediamine by the reduction of orthonitroaniline.

As is well known phenylenediamines, which are useful dyestuff intermediates, are prepared by reducing nitroanilines and one of the methods heretofore employed comprises reducing nitroaniline to phenylene diamine by the Béchamp method (Industrial and Engineering Chemistry, 40, 1575; 41, 1841 and 42, 1661), a simple and inexpensive method employing iron and dilute hydrochloric, sulfuric or acetic acid, or iron salts of these acids, at temperatures ranging from 70° C. to reflux.

However, I have found that when orthonitroaniline is reduced to orthophenylenediamine by the usual Béchamp method wherein only sufficient acid and/or salt is used to form ferric ions, the yield is about 85% of theory. Moreover, under the conditions obtaining in the usual Béchamp method, the orthonitroaniline suffers decomposition, with the formation of ammonia along with other by-products. It is, accordingly, an object of my invention to provide a process for reducing orthonitroaniline to orthophenylenediamine which is free from the foregoing and other disadvantages.

Another object of my invention is the provision of an improved process for the reduction of orthonitroaniline to orthophenylenediamine whereby the yield of orthophenylenediamine is increased appreciably and substantially no decomposition of the orthoaniline is effected.

Still another object of my invention is to provide a process for the reduction of orthonitroaniline employing an excess of acid.

Other objects and advantages of my invention will appear from the following description and claims.

I have discovered that a substantially greater yield of orthophenylenediamine is obtained by modifying the Béchamp method of reducing orthonitroaniline. Thus, I have found that when the orthonitroaniline is added to the heated reaction mixture, comprising water, iron and a small amount, i.e. approximately 1% by weight, of acid such as hydrochloric, sulfuric or acetic acid, simultaneously with additional or excess acid in an amount of from 1 to 3 molar proportions of orthonitroaniline not only is less time required for the reducing reaction on orthonitroaniline to take place, i.e. under the conditions of my invention the reaction progresses with greater rapidity requiring but about 30 to 35 minutes as against about four hours heretofore required to complete the reduction of the nitroaniline, but also the yield of orthophenylenediamine is substantially increased.

The following examples will serve to illustrate the improved results obtained in accordance with the process of this invention. It is to be understood, however, that these examples are not to be considered as being limitative of the invention disclosed and claimed.

EXAMPLE I

Béchamp method

There is charged into a 1½ liter iron reduction kettle equipped with agitator and reflux condenser 1000 grams of water, 132 grams of iron and 10 grams of glacial acetic acid. The reaction mixture is heated to 95° C., and there is added over a period of 4 hours, 110 grams (0.796 mole) of orthonitroaniline, maintaining the temperature at 95 to 98° C. When the addition is complete, heat an additional 2 hours at 95 to 98° C., then add a few grams of sodium carbonate to precipitate ionized iron. Filter at 90° C., and wash the filter cake free of the product with boiling water. The solution of orthophenylenediamine may be used as such, or the diamine may be isolated in the usual manner. Yield is 73.1 grams orthophenylenediamine (85% of theory).

EXAMPLE II

Béchamp method modified

There is charged into a 1½ liter iron reduction kettle equipped with two graduated dropping funnels, reflux condenser, and agitator 1000 grams of water, 132 grams of iron borings and 10 grams of glacial acetic acid. The reaction mixture is heated to 95° C., and there is added simultaneously over a period of 35 minutes from the two dropping funnels 115 grams of glacial acetic acid (1.92 moles), 110 grams of orthonitroaniline (0.796 moles), maintaining the temperature at 95 to 98° C. When the addition is complete, heat an additional 10 minutes at 95 to 98° C., and add about 125 grams of sodium carbonate to make the reaction alkaline to precipitate ionized iron. Filter at 90° C., and wash the filter cake free of the product with boiling water. The solution of orthophenylenediamine may be used as such or may be isolated in the usual manner. Yield is 83.5 grams orthophenylenediamine (97% of theory).

EXAMPLE III

Béchamp method modified

There is charged into a 1½ liter iron reduction kettle equipped with two graduated dropping funnels, reflux condenser, and agitator 1000 grams of water and 132 grams of iron borings. The reaction mixture is heated to 95° C., and there is added simultaneously over a period of 35 minutes from the two dropping funnels 150 grams of dilute hydrochloric acid (1.19 moles), 54.5 grams of orthonitroaniline (0.796 mole), maintaining the temperature at 95 to 98° C. When the addition is complete, heat an additional 10 minutes at 95 to 98° C., and add about 125 grams of sodium carbonate to make the reaction alkaline to precipitate ionized iron. Filter at 90° C., and wash the filter cake free of the product with boiling water. The solution of orthophenylenediamine may be used as such or may be isolated in the usual manner. Yield is 92.4% of theory.

EXAMPLE IV

Béchamp method modified

There is charged into a 1½ liter iron reduction kettle equipped with two graduated dropping funnels, reflux condenser, and agitator 1000 grams of water and 132 grams of iron borings. The reaction mixture is heated to 95° C., and there is added simultaneously over a period of 30 minutes from the two dropping funnels 110 grams of hydrochloric acid (1.19 moles), 71.4 grams of orthonitroaniline (0.796 mole), maintaining the temperature at 95 to 98° C. When the addition is complete, heat an additional 10 minutes at 95 to 98° C., and add about 125 grams of sodium carbonate to make the reaction alkaline to precipitate ionized iron. Filter at 90° C., and wash the filter cake free of the product with boiling water. The solution of orthophenylenediamine may be used as such or may be isolated in the usual manner. Yield is 96.8% of theory.

It is to be understood that the foregoing detailed description is merely given by way of illustration and that many variations may be made therein without departing from the spirit of my invention.

Having described my invention, what I desire to secure by Letters Patent is:

1. Process for reducing orthonitroaniline to orthophenylenediamine which comprises forming a mixture of water, iron and an acid selected from the group consisting of hydrochloric acid, sulfuric acid and glacial acetic acid, heating said mixture to an elevated temperature of about 95 to 98° C., adding orthonitroaniline and additional acid simultaneously to said mixture over a period of about 30 to 35 minutes while maintaining substantially the same elevated temperature, the amount of acid added being from 1 to 3 molar proportions for each molar proportion of orthonitroaniline, whereby there are obtained in the reaction zone conditions which promote the reducing reaction with a minimum of by-products, heating the resulting mixture for a short period of time at substantially the same elevated temperature, precipitating the ionized iron from said resulting mixture and filtering to obtain a filtrate comprising a solution of orthophenylenediamine.

2. Process according to claim 1 wherein the acid employed is acetic acid.

3. Process according to claim 1 wherein the acid employed is hydrochloric acid.

4. Process for reducing orthonitroaniline to orthophenylenediamine which comprises forming a mixture of water, iron and glacial acetic acid, heating said mixture to a temperature of about 95° C., adding orthonitroaniline and additional acetic acid to said mixture over a period of about 35 minutes while maintaining the said mixture at a temperature of about 95 to 98° C., the amount of acid added being from 1 to 3 molar proportions for each molar proportion of orthonitroaniline, whereby there are obtained in the reaction zone conditions which promote the reducing reaction with a minimum of by-products, heating the resulting mixture for a short period of time to a temperature of 95 to 98° C., precipitating the ionized iron from said resulting mixture and filtering to obtain a filtrate comprising a solution of orthophenylenediamine.

5. Process for reducing orthonitroaniline to orthophenylenediamine which comprises forming a mixture of water, iron and glacial acetic acid, heating said mixture to a temperature of about 95° C., adding orthonitroaniline and additional glacial acetic acid to said mixture over a period of about 35 minutes while maintaining the said mixture at a temperature of about 95 to 98° C., the amount of acid added being from 1 to 3 molar proportions for each molar proportion of orthonitroaniline, whereby there are obtained in the reaction zone conditions which promote the reducing reaction with a minimum of by-products, heating the resulting mixture for 10 minutes to a temperature of 95 to 98° C., precipitating the ionized iron from said resulting mixture by the addition of a small amount of sodium carbonate and filtering to obtain a filtrate comprising a solution of orthophenylenediamine.

References Cited in the file of this patent

UNITED STATES PATENTS

| 2,578,328 | Von Bramer et al. | Dec. 11, 1951 |
| 2,614,126 | Krueger | Oct. 14, 1952 |